(12) United States Patent
Curran

(10) Patent No.: US 12,146,939 B1
(45) Date of Patent: Nov. 19, 2024

(54) FUSING MEASUREMENTS FROM SENSORS OF MULTIPLE DEVICES INTO A SINGLE COORDINATE SPACE

(71) Applicant: Apple Inc., Cupertino, CA (US)

(72) Inventor: James T. Curran, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 328 days.

(21) Appl. No.: 17/371,621

(22) Filed: Jul. 9, 2021

Related U.S. Application Data

(60) Provisional application No. 63/061,124, filed on Aug. 4, 2020.

(51) Int. Cl.
*G01S 13/42* (2006.01)
*G01S 13/56* (2006.01)
*G01S 13/72* (2006.01)

(52) U.S. Cl.
CPC .............. *G01S 13/42* (2013.01); *G01S 13/56* (2013.01); *G01S 13/72* (2013.01)

(58) Field of Classification Search
CPC ........... G01S 13/42; G01S 13/56; G01S 13/72
USPC .................... 342/72, 158, 27, 52, 128
See application file for complete search history.

(56) References Cited

U.S. PATENT DOCUMENTS

| | | | |
|---|---|---|---|
| 9,778,351 B1 * | 10/2017 | Khosla ................. | H04N 23/698 |
| 2006/0049974 A1 * | 3/2006 | Williams ............. | G06V 10/255 |
| | | | 342/52 |
| 2013/0181860 A1 * | 7/2013 | Le ......................... | G01S 13/931 |
| | | | 342/72 |
| 2017/0176583 A1 | 6/2017 | Gulden et al. | |
| 2017/0328997 A1 | 11/2017 | Silverstein et al. | |
| 2022/0326370 A1 | 10/2022 | Ding et al. | |

* cited by examiner

*Primary Examiner* — Bo Fan
(74) *Attorney, Agent, or Firm* — Aikin & Gallant, LLP

(57) ABSTRACT

Embodiments described herein provide for a technique to enable sensor data gathered by multiple electronic devices, such as smart home devices, to be fused into a single coordinate space to enable a higher sensor resolution at each device. For example, multiple sensor equipped devices may communicate over a network to share sensor data between devices. Each device can combine local sensor data with remote sensor data received from other devices to increase the angular resolution of the detected sensor data. To enable this combination, motion characteristics of commonly detected objects can be used to enable the devices to determine a set of relative positions. Coordinate space transformations can then be computed based on the relative positions. Sensor data can be fused using the determined coordinate space transformations.

26 Claims, 13 Drawing Sheets

FUSING MEASUREMENTS FROM SENSORS OF MULTIPLE DEVICES INTO A SINGLE COORDINATE SPACE

CROSS-REFERENCE

This application claims the benefit of U.S. Provisional Application Ser. No. 63/061,124, filed on Aug. 4, 2020, which is hereby incorporated herein by reference.

FIELD

Embodiments described herein relate generally to a system and method of enabling sensor data from multiple devices to be combined into a single coordinate space.

BACKGROUND OF THE DESCRIPTION

Radar sensors can be used by electronic devices to give those devices a degree of spatial awareness. The required range accuracy and angular resolution of those sensors can vary based on the intended purpose of the sensor data. Collision avoidance systems for vehicles or autonomous robots may be required to have higher resolution sensors relative to sensors that are designed to simply detect motion or the simple existence of a nearby object. For devices that are movable and positional, but not autonomously mobile, the radar sensor used by those devices may be a relatively lower power sensor with a lower angular resolution relative to navigational radar sensors.

SUMMARY OF THE DESCRIPTION

Embodiments described herein provide systems and methods to enable the fusing of measurements from sensors of multiple devices to a single coordinate space. Multiple sensor equipped devices may communicate over a network to share sensor data between the devices. The combined data can enable data gathered by lower power sensors used by multiple consumer electronic devices, such as smart home electronic devices or smart home appliances, to be combined, enabling an increase in overall resolution relative to what is possible with the sensors of the individual devices. To enable this combination, motion characteristics of commonly detected objects can be used to enable the devices to determine a set of relative positions. Coordinate space transformations can then be computed based on the relative positions. Sensor data can be fused using the determined coordinate space transformations.

One embodiment provides for a method comprising tracking an object via a first electromagnetic spatial sensor on a first electronic device, wherein tracking the object includes gathering a first set of sensor measurements of the object via a first sensor transceiver and determining a first set of direction and range measurements to the object via the first set of sensor measurements, receiving a second set of direction and range measurements to the object from a second electronic device, the second set of direction and range measurements determined by a second sensor on the second electronic device for the first period of time, estimating, by the first electronic device based on a comparison of the first set of direction and range measurements with the second set of direction and range measurements, a position for the object relative to the second electronic device, calculating, based on the position of the object relative to the second electronic device, a position of the second electronic device relative to the first electronic device, and storing a position of the first electronic device relative to the second electronic device. The relative positions can be used to compute a coordinate space transformation that enables the fusion of sensor data from multiple devices. Sensor characteristics can also be adjusted based on the determined relative positions of the devices. All sensor characteristics can be adjusted based on distance, including but not limited to transmit power, transmit frequency, transmit time-multiplexing, and transmit signal modulation (e.g., chirp/coding, etc.).

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments described herein provide techniques to enable spatial sensor data from multiple devices to be fused into a single coordinate space. Each of the multiple devices can receive sensor data from other devices and use the coordinates of objects detected within that sensor data to determine the relative locations of the multiple devices. Once the relative locations of the multiple devices are determined, a coordinate space transformation can be configured to enable objects detected by one device to be quickly translated into the coordinate space of other devices. Additionally device and sensor optimizations can be performed based on knowledge of the spacing between devices. Sensor transmit power for devices that are well spaced may be increased, while closely spaced devices may reduce sensor transmit power to avoid interference.

The following description and drawings are illustrative and are not to be construed as limiting. Various embodiments and aspects will be described with reference to details discussed below, and the accompanying drawings will illustrate the various embodiments. Numerous specific details are described to provide a thorough understanding of various embodiments. However, in certain instances, well-known or conventional details are not described in order to provide a concise discussion of embodiments.

The terminology used in this description is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Some processes are described below in terms of some sequential operations. However, it should be appreciated that some of the operations described may be performed in a different order. Moreover, some operations may be performed in parallel rather than sequentially.

Figure 1:
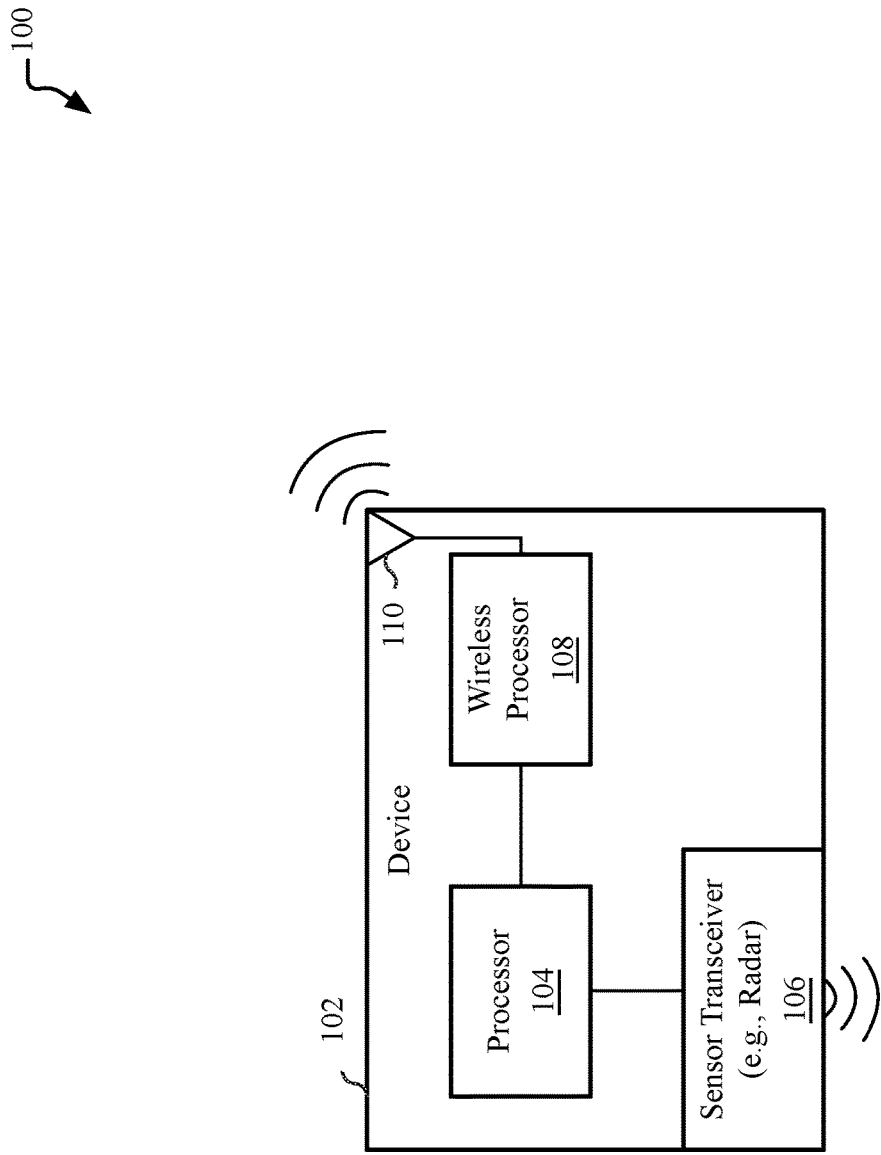
FIG. 1 is a block diagram of a network operating environment for an electronic device.

FIG. 1 is a block diagram of a network operating environment 100 for an electronic device 102. The electronic device 102 can be a variety of electronic devices, such as a smart speaker device, television, or television set top box. Aspects of the electronic device 102 may also be found in other electronic devices, such as smart home appliances and electronic devices. Exemplary smart home appliances and electronic devices include thermostats, refrigerators, washers, dryers, lighting control systems, and the like.

In one embodiment the electronic device 102 includes a processor 104 having multiple processor cores. The processor cores can enable the processor 104 to function as one or more of an application processor, sensor processor, and secure processor. The device 102 can also include a wireless processor 108 coupled with an antenna 110. The wireless processor 108 can enable the electronic device 102 to communicate over a wireless network, such as but not limited to a Wi-Fi network, Bluetooth personal area network, or mobile data network (e.g., long-term evolution (LTE), 5G, etc.). The electronic device 102 can also include a sensor transceiver 106. In one embodiment the sensor transceiver 106 is a low power radar sensor that enables the electronic device 102 to determine the position of the appliance relative to surfaces and objects in the environment surrounding the smart home appliance. The field of view of the sensor transceiver 106 can vary based on the type of sensor. In one embodiment the sensor transceiver 106 has a 360 degree Field of view and may be capable of sweeping that view multiple times a second. The sensor transceiver 106 may be relatively precise at range detection for objects within the environment, but may have a relatively limited angular resolution. In other embodiments, the field of view and/or sweep area of the sensor transceiver 106 may be focused to less than 360 degrees and sweep the focused view at a higher sweep rate. In one embodiment, the device includes an MIMO radar sensor that includes a set of antennas spaced around the electronic device 102, enabling the device to sense the entire field of view simultaneously without requiring a sweep or scan.

In one embodiment, the ability to resolve moving objects within the environment of the electronic device 102 can be improved by combining sensor data from multiple devices. Multiple radar equipped electronic device 102 may communicate over a network to share radar sensor data between the devices. The communication can be performed wirelessly via a network connection that is enabled via the wireless processor 108. Each instance of the electronic device 102 can combine local sensor data with remote sensor data received from other devices to increase the angular resolution of the detected sensor data. The various electronic devices 102 may be multiple instance of the same type of device. Different types of electronic devices may also interact, where each device is capable of communicating wirelessly with other devices and has a sensor transceiver 106 that is able to gather sensor data about the spatial environment around the device. While radar is given as an example type of sensor, other types of sensor data can also be fused across multiple devices. For example, sensor data from lidar sensors or ultrasonic sensors may also be fused.

To perform the fusion of the sensor data from the multiple electronic devices, each device performs operations to determine the position of the device relative to the other devices. Traditional location determination techniques may be inapplicable to this task. For example, an instance of the electronic device 102 may not possess satellite-based positioning receivers. If satellite-based positioning receivers are present, the horizontal accuracy of satellite-based location determination for the electronic device 102 may be limited due to the devices being positioned in an indoor environment. Furthermore, radio-frequency positioning may not be able to determine the position of the device with sufficient accuracy. Accordingly, it would be advantageous to make use of an electromagnetic or sonic sensor determine the relative position of the devices. Once the relative position of the devices is determined, various advantages in sensor system management and sensor processing may be realized.

Figure 2A:
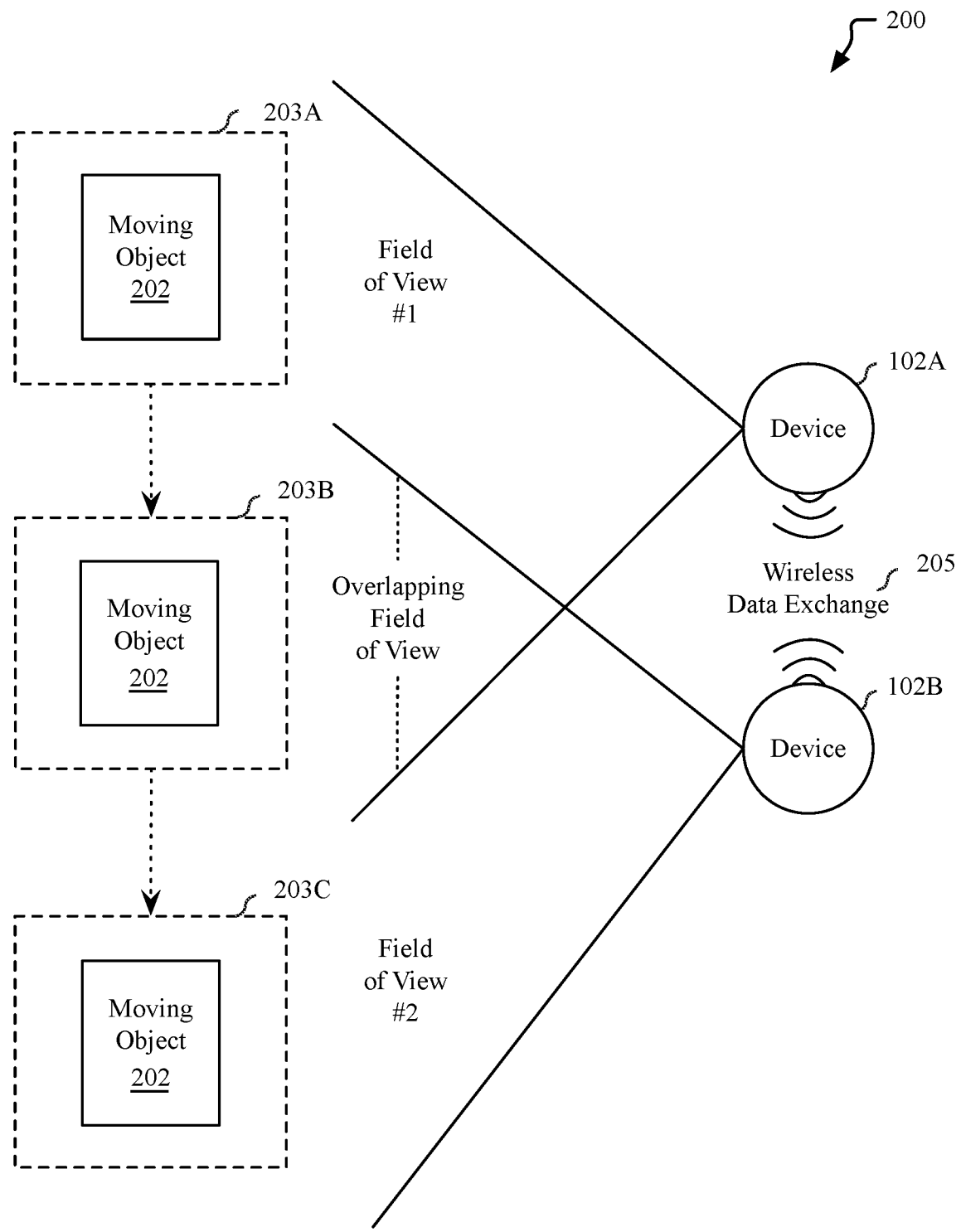
FIG. 2A-2C illustrate a system including multiple electronic devices.
Figure 2B:
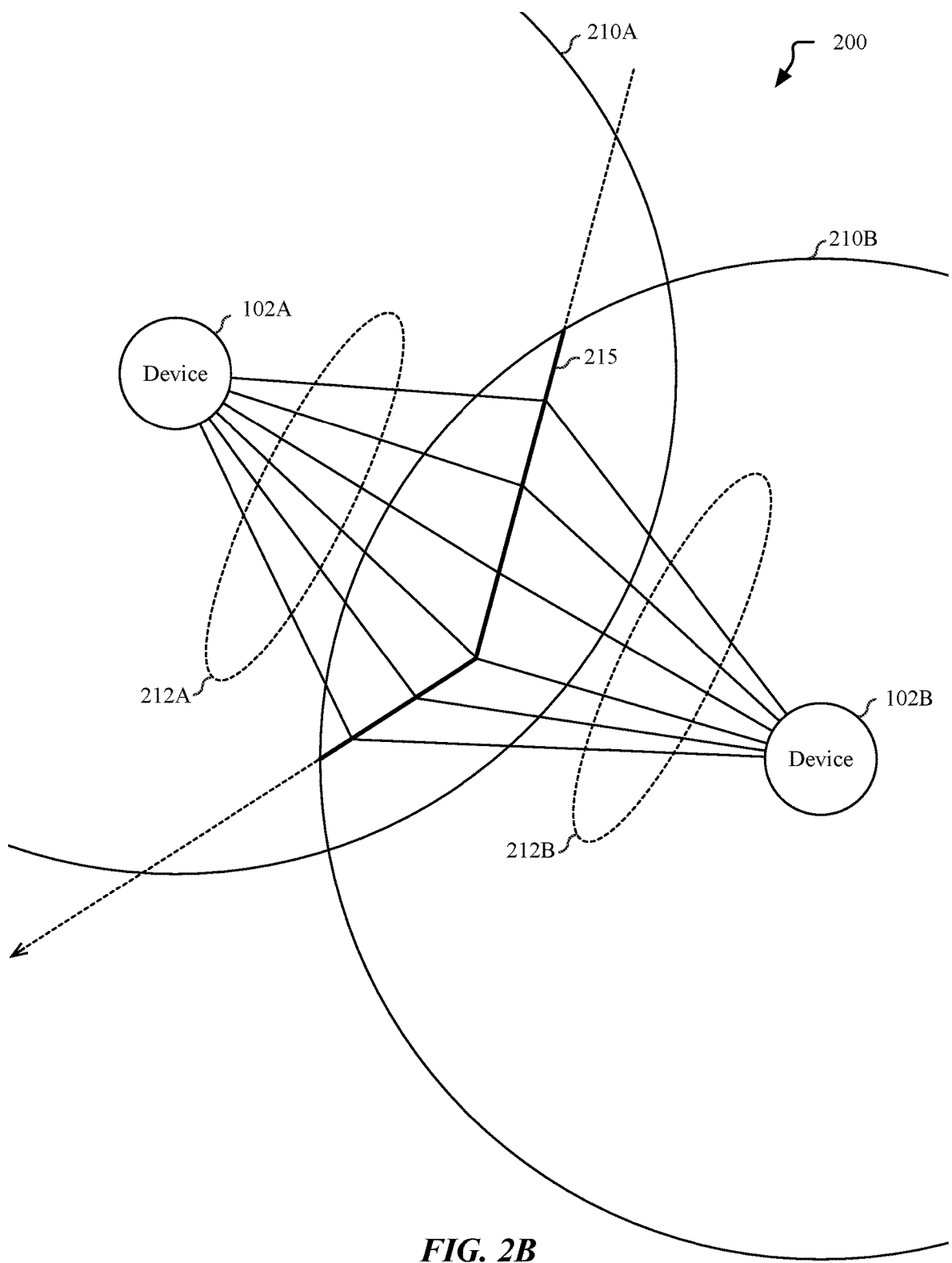
Figure 2C:
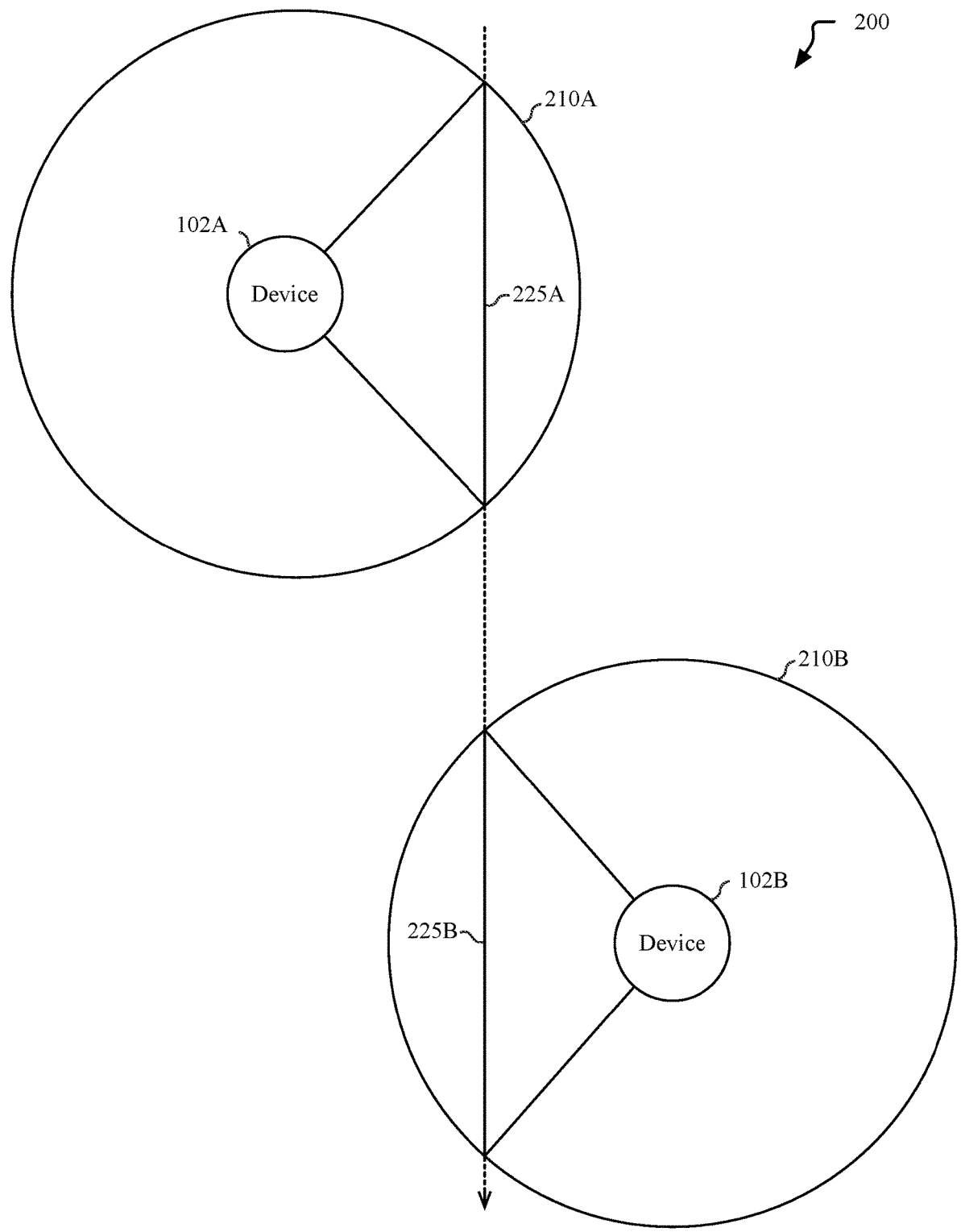

FIG. 2A-2C illustrate a system 200 including multiple electronic devices 102A-102B. FIG. 2A illustrates a view of a system 200 in which the multiple electronic devices 102A-102B are each equipped with spatial sensors and positioned such that the spatial sensors have an overlapping field of view. FIG. 2B illustrates an additional view of the system 200 in which the electronic devices 102A-102B have different overlapping field of view. FIG. 2C illustrates an additional view of the system 200 in which the electronic devices 102A-102B have a non-overlapping field of view. The precise field of view for a device can vary based on the types of sensors that are available to the device and the configuration of those sensors. Whether device sensors have overlapping fields of view can depend on, for example, the relative positions of the devices, the sensitivity of the sensors, and whether any obstructions are present in the environment.

The multiple electronic devices 102A-102B are each instances of electronic device 102 of FIG. 1. Each electronic device 102A-102B is equipped with a sensor transceiver, such as but not limited to a radar transceiver. Electronic devices 102A-102B may participate in wireless data exchange operations 205 that include advertising available services, discovering the presence of other devices, and discovering services that are available at those other devices. The type of services offered by a device can depend on the type of device.

The wireless data exchange operations 205 can be performed over a wireless network or via direct wireless communications. For example, the electronic devices 102A-

102B may be connected to a common network via an infrastructure Wi-Fi access point. The electronic devices 102A-102B may also discover the other devices presence via wireless advertisement signals that are transmitted via Wi-Fi Direct, Bluetooth, or other wireless protocols (e.g., Zigbee, Z-wave). The wireless data exchange operations 205 can also include the exchange of identifier information and device capabilities. The identifier information can identify the type of device and/or a user account identifier that is associated with the device. The capabilities can specify, for example, the types of sensors that are equipped on each device and whether the sensor data can be shared with other devices. Electronic devices 102A-102B can share location information if any of the devices have been able to determine a location for the devices. The locations may be coarse locations, such as a general geographic region, or location identifiers that have meaning to one or more users of the electronic device (e.g., home, office, etc.). If a more precise location can be determined for a device, the precise location can be shared between devices. In one embodiment, devices can shared determined relative locations if the relative locations of two or more devices have been determined.

As shown in FIG. 2A, using techniques described herein, the electronic devices 102A-102B can use sensor measurements of commonly detected objects that pass within the sensor field of view of the devices to determine the relative positions of the devices to each other. In the event that the electronic devices 102A-102B are not aware of each other's position, each device can calculate the position of the other device if those devices are able to track the same moving object 202. Each device 102A-102B can determine direction and range measurement to the object as the object moves. If a device has both sets of measurements, the device can solve for the position of the other device. The moving object 202 can be anything resolvable by the spatial sensors of the electronic devices 102A-102B, including humans, animals, or self-locomoting devices.

For example, a moving object 202 at a position 203A within the field of view (Field of View #1) of a first electronic device 102A may be detected as the device transits the field of view of the first electronic device 102A. As the device transits the field of view of the first electronic device 102A, a range measurement may be gathered during each cycle or sweep of the sensor on the device. Multiple range measurements can be gathered and combined to determine a path that is followed by the moving object. The range measurements can be gathered by the first electronic device 102A-102B as the moving object 202 moves from position 203A to position 203B, then from position 203B to position 203C, which is outside of the field of view of the first device 102A. Likewise, as the moving object 202 transits into the field of view (Field of View #2) of a second electronic device 102B, multiple range measurements can be gathered and combined to determine a path that is followed by the moving object. Range measurements can be gathered by the second electronic device 102B as the moving object 202 moves from position 203B to position 203C, then outside of the field of view of the second electronic device 102B.

In one scenario, the electronic devices 102A-102B have an overlap in their fields of view. For example, the illustrated electronic devices 102A-102B each have a view of position 203B. Accordingly, sensor readings may be gathered by each of the devices 102A-102B as the moving object 202 transits the overlapping field of view that includes position 203B. Using the sensor data collected by the other device for the commonly detected moving object as the object moves within the common field of view, each electronic devices 102A-102B can determine a set of relative positions to the moving object 202 and plot a path for the object. One or more of the electronic devices 102A-102B can then compare the locally detected path with the remotely detected path to determine the position of the other device. For example, an offset on the local coordinate space of each device to the other devices can be determined by computing a coordinate space transformation that will equalize the paths. This coordinate space transformation can then be used to enable objects detected by one of the electronic devices (e.g., electronic device 102A) to be positioned within the coordinate space of the other electronic device (e.g., electronic device 102B). While in this scenario the electronic devices 102A-102B have a portion of the scene that they both observe, the devices need not be positioned such that they can observe each other.

As shown in FIG. 2B, the electronic devices 102A-102B can have sensor fields of view 210A-210B and are positioned such that a portion of those fields of view 210A-210B overlap. An object (e.g., moving object 202) can move into and out of the fields of view 210A-210B. When the object moves through the fields of view 210A-210B, a path for the object can be observed. The portion of the path (215) that is observed by both electronic devices 102A-102B can be used to enable the electronic devices 102A-102B to determine their relative positions. In one embodiment, the path taken by the object can be computed based on a set of range measurements 212A-212B made by the electronic devices 102A-102B. Electronic device 102A can gather range measurements 212A, while electronic device 102B can gather range measurements 212B.

Until the electronic devices 102A-102B are able to determine their relative positions, the devices may not have information on whether the devices have overlapping sensor fields of view 210A-210B. Instead, the electronic devices 102A-102B can compare the range measurements for any moving objects that are detected and then determine if any detected objects are commonly detected objects. For example, commonly detected objects can be determined when an object is observed by each of the electronic devices 102A-102B within a period of time and the path of the object that is detected by one device appears to be a transformation of the path detected by another device. The nature of the transformation of the path and the ranges in the set of range measurements 212A-212B can then be processed to enable the electronic devices to determine their relative positions.

As shown in FIG. 2C, the electronic devices 102A-102B may be positioned such that the fields of view 210A-210B do not overlap. In the scenario in which there is no overlap in the fields of view of the electronic devices 102A-102B, but the moving object 202 is observed by both devices, then the sensor measurements can be used calculate a motion vector (e.g., speed and direction) for the object and generate a motion model for the detected object. The motion model can then be used to estimate the objects position with respect to each device over time. This estimate can then be compared to objects that are detected by sensors of other devices. Multiple observations can be used and the relative positions of the electronic devices 102A-102B can be refined over time.

For example, a moving object can traverse the field of view 210A of a sensor of the first electronic device 102A. The path 225A of the object while within the field of view 210A can be used to calculate a motion vector y for the object. The motion vector can be a mathematical model that describes the observed motion of the object through space.

The motion vector y may be used to estimate a future position of the object, assuming the object does not significantly change the direction or speed of its motion after leaving the field of view 210A of the sensor first electronic device 102A. If the moving object passes into the field of view 210B of the sensor of the second electronic device 102B at a time consistent with the estimation calculated by first electronic device 102A, the first and second electronic device may presume a relative distance that is based on the travel time of the moving object between devices. For example, if an object passes a reference point in the field of view 210A of the sensor of the first electronic device 102A while moving at one meter per second and passes the same reference point in the field of view 210B of the sensor of the second electronic device 102B four seconds later, the electronic devices 102A-102B may store one data point that indicates that the devices may be four meters apart. This stored data point may be aggregated with other data points that were determined based on other detected objects to refine the estimated distance over time. Analysis of the paths of the detected object enables the electronic devices 102A-102B to determine the relative orientation of their coordinate spaces and compute a transformation matrix that enables the coordinates of an object as detected by one of the electronic devices to be translated into the coordinate space of the other electronic device.

To enable the use of a calculated motion vector y of a moving object to be used to estimate the relative positions of the electronic devices 102A-102B in the case of non-overlapping fields of view 210A-210B, the electronic devices 102A-102B include logic to enable the determination, within a probability threshold, that separate observations correspond with the same object. The specific technique used can vary based on the type of sensor in use. For example, in one embodiment the logic can use patterns within the motion of the detected object and compare the motion patterns. Differing motion patterns can be used to disambiguate between multiple objects. For example, where the movement of people within the fields of view 210A-210B are used to determine the relative positions and orientations of the electronic devices 102A-102B different people may be distinguish based on differences in movement patterns between those people. Different individuals may have different walking gaits or walking speeds. Sensor processing logic can analyze resonance in the doppler domain to distinguish between different individuals. Different individuals can be detected via harmonic analysis of the stride and/or gait of the individual.

Depending on the type of sensor that is used, relative differences in size may be used to distinguish between different individuals. For example, where the electronic devices 102A-102B are placed in a household that include companion animals, differences between movement patterns can be used to distinguish between different companion animals or between companion animals and humans. For example, differences in sizes may be used to distinguish between different companion animals and/or between companion animals and humans. Size differences between adults and children may also be detected.

Some sensors are also capable of performing biometric analysis of detected individuals. For example, heart rate may be determinable for a detected individual if the individual is within a range threshold. The heart rate may be used to distinguish between different individuals that are detected at different points in time. Heart rates may also be used to distinguish between multiple individuals that are detected currently.

In one embodiment, detected individuals are also distinguishable via detection of mobile devices (e.g., table computers, smartphones, wearable accessories) carried or worn by an individual. Where a trusted relationship exists between the electronic devices 102A-102B and a mobile device of a user, the electronic devices 102A-102B may be able to query a mobile device carried by an individual. Individuals may also be distinguishable based on network or wireless advertisements that are broadcast by a mobile device carried by a user.

In the case of a radar equipped device exemplary identification strategies are shown in Table 1 below.

TABLE 1

Detected Object Differentiation Strategies

| Strategy | Feature | Example Measurements |
| --- | --- | --- |
| Imaging: 'instantaneous' identification based on 'appearance' | Shape | Depth profile |
| | Material/Size | RCS |
| | Size | Field of View 2D point-cloud |
| Kinematics: 'rapid' identification based on short-term body-leave motion and/or shape-change | Rigid vs Non-Rigid Body | RCS variability |
| | | Doppler Spread |
| | | Depth profile variability |
| | Gait Analysis | Doppler Spread |
| | | Range-Spread |
| | | Cadence |
| | Biometrics | Heart Rate |
| | | Breathing Rate |
| | | Breathing Waveform |
| Routine: identification based on long-term observation of routine/behavior | Room-to-Room Pattern | Home-level tracking |
| | Favorite Seat | Room-level localization |
| | Favorite Pose | Pose detection |
| | Fidgety/Still while sitting | Room-level tracking |
| | Presence vs Time-of-day | Home-level tracking |
| | Dwell-time in location | Home-level tracking |
| Device: bootstrap with device-based information and track | Voice recognition | Smart Appliance Virtual Assistant |
| | iPhone/Watch ID | UBE/BLE/WiFi from device |

The above strategies can be used to differentiate between, for example, a human and a machine, a human and a companion animal, and an adult and a child. Some technique may be used to recognize an individual user of the device and/or differentiate between users in a family of users.

Figure 3:
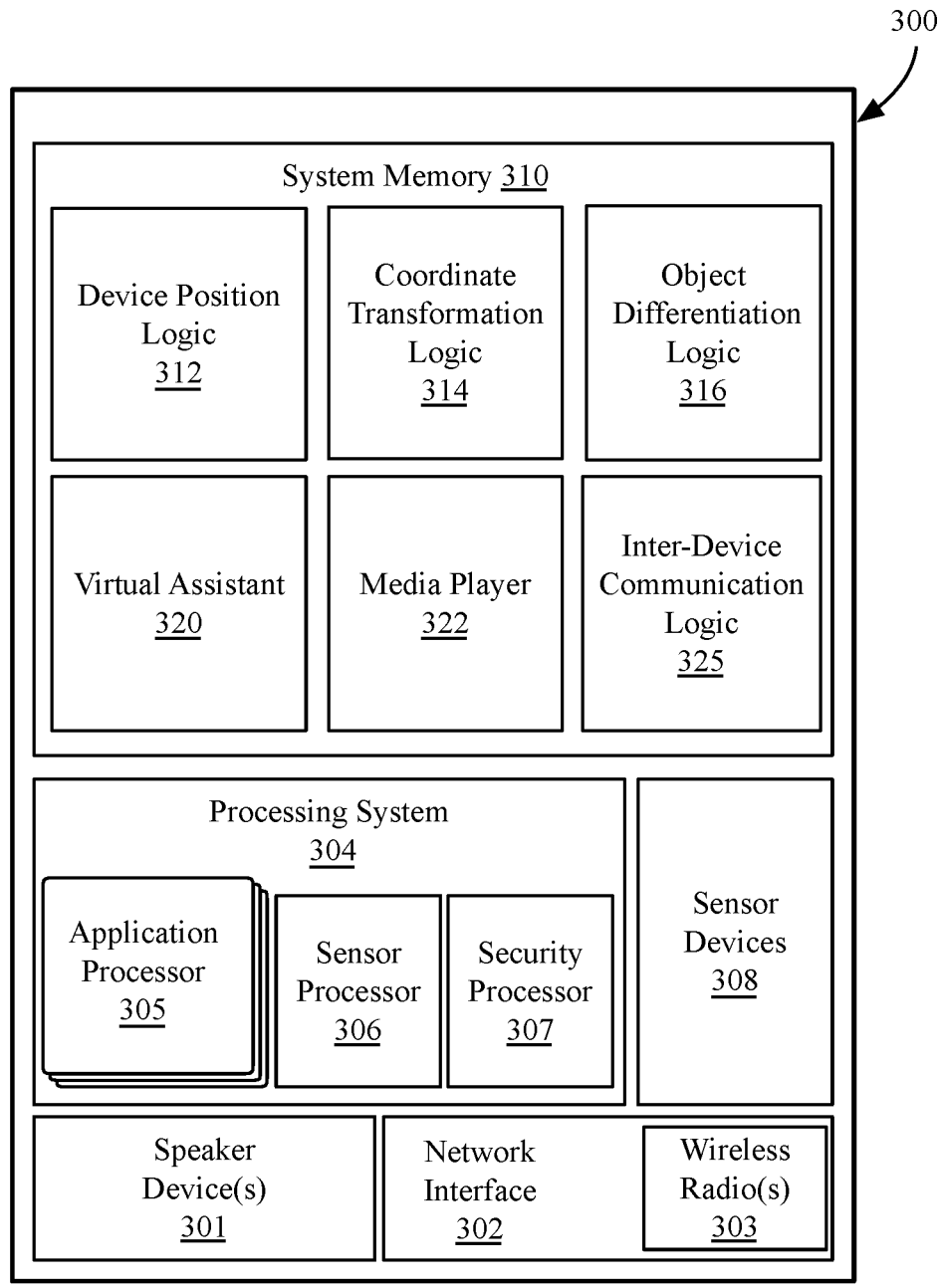
FIG. 3 illustrates an electronic device that includes hardware and software logic to enable the fusion of measurements from sensors of multiple devices into a single coordinate space.

FIG. 3 illustrates an electronic device 300 that includes hardware and software logic to enable the fusion of measurements from sensors of multiple devices into a single coordinate space. The electronic device 300 can be any electronic device described herein. The electronic device 300 includes a processing system 304 including multiple types of processors and one or more memory devices that are configured as system memory 310. The processing system 304 includes a multi-core application processor 305, a sensor processor 306, and a security processor 307. The electronic device also includes one or more speaker devices 301 to enable playback of the audio portion of media, alarm, alert, notification, or telephone calls. A network interface 302 includes a network processor and one or more wireless radios 303. The network interface 302 can enable support for wireless networking protocols such as, but not limited to Bluetooth, Wi-Fi, near field communication (NFC), other wireless networking technologies. In some implementations, the network interface 302 may also support a wired network connection.

The electronic device 300 also includes a set of sensor devices 308. The sensor devices 308 include a variety of sensors including but not limited to motion sensors, light sensors, proximity sensors, biometric sensors, audio sensors (e.g., microphones), and image sensors (e.g., cameras). The sensor devices 308 can also include an accelerometer, gyroscope, or other motion sensors that can detect and analyze the movement of the electronic device 300. In one embodiment the audio sensors are configurable to perform ultrasonic spatial sensing to enable the electronic device 300 to self-orient within an environment. The sensor devices 308 can also include electromagnetic spatial sensors such as radar or lidar sensors that facilitate self-orientation of the device, enable power management functionality by detecting the presence of nearby users, and enabling or disabling one or more device functions when the presence of absence of individuals and/or users is detected near the electronic device 300. The sensor processor 306 can enable low-power monitoring of always-on sensors within the suite of sensor devices 308.

The system memory 310 can be a system virtual memory having an address space that includes volatile and non-volatile memory. The system memory 310 can store instructions for software logic that is executed by the processing system 304. The software logic includes system logic such as device position logic 312, coordinate transformation logic 314, object differentiation logic 316, and inter-device communication logic 325. The software logic also include logic to enable user-facing functionality for the electronic device 300, including but not limited to a virtual assistant 320 and a media player 322.

The system logic is executed by various processors of the processing system 304, including the application processor 305 and sensor processor 306. For example, some aspects of the device position logic 312, coordinate transformation logic 314, and/or object differentiation logic 316 and may be executed at least in part by the sensor processor 306 and a portion of this logic may reside in memory associated with the sensor processor 306. Some processing for the inter-device communication logic 325 may be performed by a network processor within the network interface 302.

The device position logic 312 includes executable instructions to enable the determination of the position of the electronic device 300. Device position can be based in part on a geospatial position, as externally specified or determined by a location services subsystem of the electronic device 300. Device position also includes a position relative to certain other electronic devices that discovered via a network or that are detected via advertisements that are broadcast wirelessly by those devices. Relative position may be determined using the common object tracking technique described herein. The device position logic 312 can also store the relative positions determined by other nearby device. The relative positions can be the relative positions of the nearby devices with respect to the electronic device 300 or with respect to other devices. The device position logic 312 can also be used to determine the position of the electronic device 300 relative to any static objects or obstructions that may be relevant to the operation of the electronic device 300. For example, where the electronic device 300 is intended for use as a smart speaker device that provides high quality audio playback, the device position logic 312 can use the sensor devices 308 to adjust audio output by the speaker devices 301 to account for walls, furniture, or obstructions near the electronic device 300.

The mutually determined relative positions of multiple devices can be used to generate and refine a device position map that includes multiple devices at a location. Coordinate transformation logic 314 can use this device map to generate and store coordinate space transformations that enables the locations of objects, items, or individuals that are detected via the sensors of one device in the map to be positioned within the coordinate space of other devices within the map, allowing each device to access a mesh network of sensors that is created by the combined sensor fields of view of the view of the various devices.

The inter-device communication logic 325 includes daemons and utilities to enable transport agnostic communication with other electronic devices. The inter-device communication logic 325 can enable device to device communication via a network and/or via a device-to-device wireless communication channel. The inter-device communication logic 325 enables coordinates of detected objects, as well as raw sensor data, to be transmitted from and received by the electronic device 300.

The system memory 310 can also include instructions to enable user facing functionality on the electronic device, such as a virtual assistant 320 and a media player 322. Such software logic can be executed party or primarily by the application processor 305. The virtual assistant 320 can be a voice activated virtual or digital assistant that can perform actions on behalf of a user, such as playing media via the media player 322, sending text or instant messages, scheduling calendar events, and/or performing other functions that can be performed on the electronic device 300. The media player 322 can enable the playback of various media types. Audio-based media (e.g., music, podcasts, etc.) may be played via the speaker devices 301. In the event the electronic device 300 includes a display (not shown), playback of media having a video portion can be performed. Logic to facilitate functionality that is specific to the type of electronic device 300 may also reside in system memory. For example, where the electronic device is a smart appliance device, software logic to manage the functionality of the smart appliance device will also reside in system memory 310.

Figure 4:
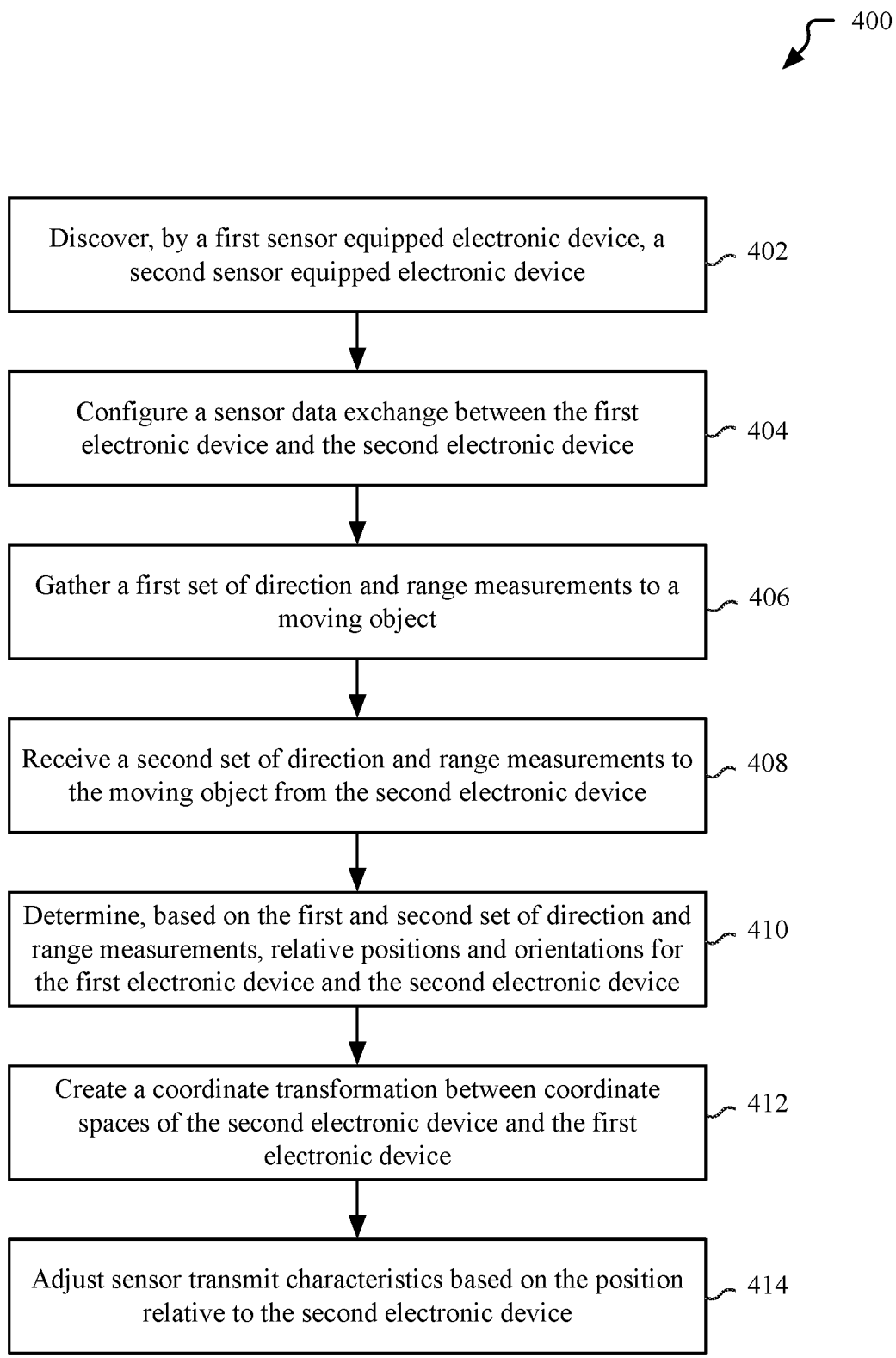
FIG. 4 illustrates a method of fusing measurements from sensors of multiple devices into a single coordinate space.

FIG. 4 illustrates a method 400 of fusing measurements from sensors of multiple devices into a single coordinate space. The method 400 also includes operations to optimize sensor transmit power based on a determined relative distance between electronic devices equipped with electromagnetic spatial sensors (e.g., radar, lidar). The method 400 can be performed by hardware and software logic of an electronic device having a network interface and one or more electromagnetic spatial sensors, such as the electronic device 300 as in FIG. 3.

Method 400 include for a first sensor equipped electronic device to perform operations to discover a second sensor equipped electronic device (402). The first electronic device can discover the second electronic device via advertisement messages broadcast by the second electronic device over a network, via a wireless advertisement mechanism, or another advertisement and discovery mechanism. The first electronic device can then configure a sensor data exchange between the first electronic device and the second electronic device (404). The sensor data exchange can occur over a network connection or a point to point wireless connection that is established between the first electronic device and the second electronic device. Sensor data for the first electronic device can be streamed over the data exchange mechanism to the second electronic device. Sensor data for the second electronic device can be streamed by the second electronic device and received by the first electronic device.

The first electronic device and the second electronic device can each gather direction and range measurements to a moving object that is detected by the sensors of the devices. The first electronic device can gather a first set of direction and range measurements to a moving object (406), while the second electronic device can gather a second set of direction and range measurements to the moving object. The first electronic device can receive the second set of direction and range measurements to the moving object from the second electronic device (408).

The first electronic device can then determine, based on the first and second set of direction and range measurements, relative positions and orientations for the first electronic device and the second electronic device (410). The second electronic device can also make a determination. The determinations made by the first electronic device and the second electronic device can be correlated and each determination may be refined based on determination made by the other device. The first electronic device can then create a coordinate transformation between coordinate spaces of the second electronic device and the first electronic device (412). The second electronic device can create a similar transformation. The coordinate transformation enables coordinates for objects detected via sensors of either device, either moving or stationary, to be translated into the coordinate space of the other device.

The relative location determination can enable other optimizations. In one embodiment, the electronic devices can adjust sensor transmit characteristics based on the position relative to the second electronic device (414). For example, sensor transmit power can be increased or decreased according to the distance between the devices. High transmit power may enable longer range sensor visibility, but may cause interference with other devices if those devices are closely positioned. Transmit timing can also be adjusted. Time-multiplexing can be used to interleave signals from multiple devices. The manner in which these signals are interleaved can be tuned based on the distance between the devices.

Figure 5:
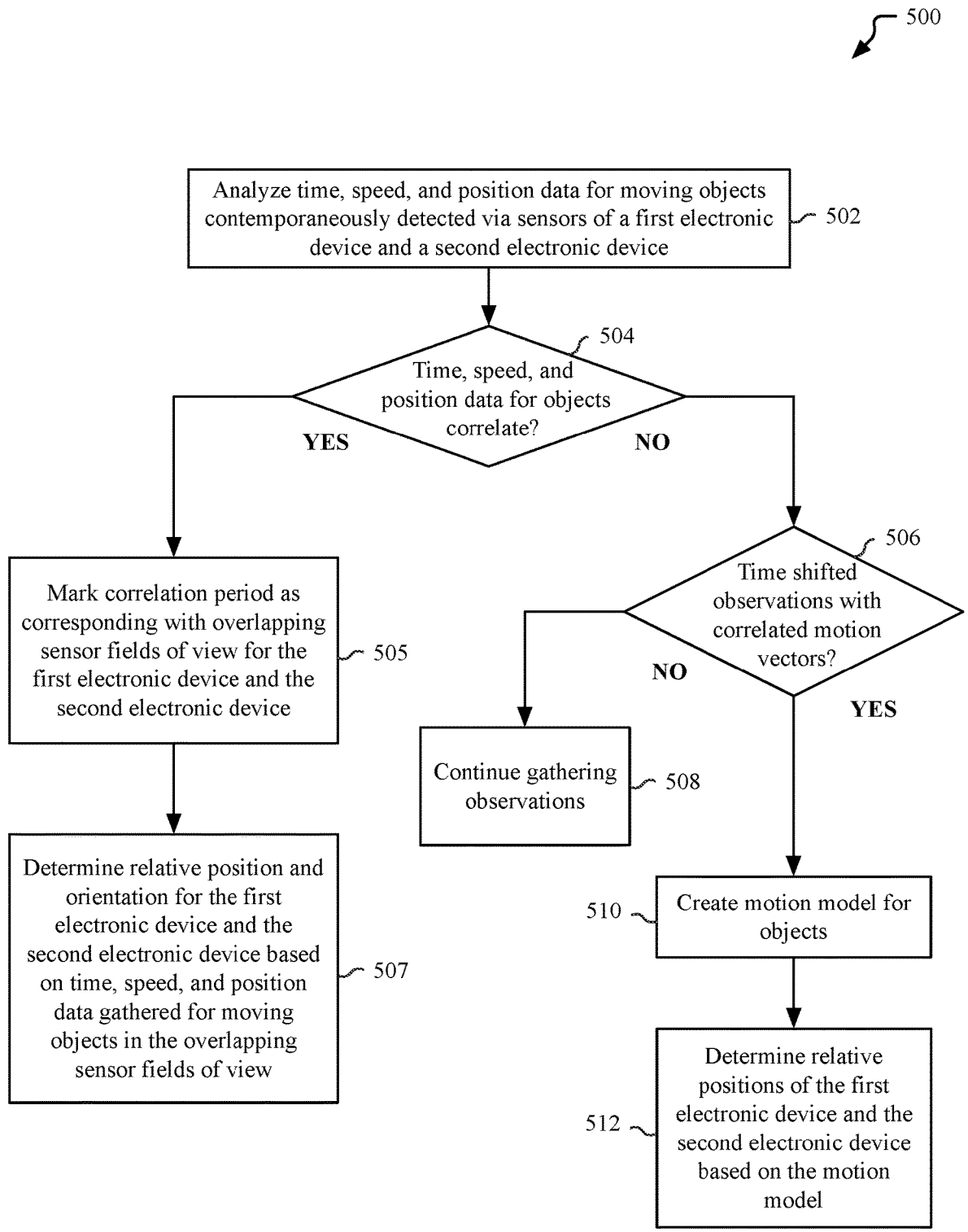
FIG. 5 illustrates a method for a sensor equipped electronic device to determine the position of the electronic device relative to other sensor equipped electronic devices

FIG. 5 illustrates a method 500 for a sensor equipped electronic device to determine the position of the electronic device relative to other sensor equipped electronic devices. This method 500 can be performed when the various electronic devices have either overlapping or non-overlapping fields of view for electromagnetic spatial sensors.

A first electronic device as described herein can analyze time, speed, and position data for moving objects contemporaneously detected via sensors of the first electronic device and a second electronic device (502). Contemporaneously detected indicates that the object is detected in at least a portion of the sensor data during the same period of time or closely spaced within time. The time, speed, and position data can be generated based locally and remotely generated sensor data. Remote sensor data can be streamed to the first electronic device by the second electronic device and processed at the first electronic device. Sensor data gathered at the first electronic device can also be streamed to the second electronic device. Alternatively, time, speed, and position data can be generated by each electronic device and streamed to and received from the other electronic device. While first and second electronic devices are described, the method 500 can be performed by an electronic device in a mesh of electronic devices that includes two or more devices.

The electronic device can determine whether the time, speed, and position data for objects correlate (504). To determine a correlation, the first electronic device can determine whether the sensor data indicates that, for a period of time, the first and second electronic device both detected the presence of an object having similar motion characteristics. Correlation in the time, speed, and position data indicates that the first and second electronic device likely have at least a partial overlap in the fields of view of sensors on the device. When a correlation is detected (YES, 504), the first electronic device can mark the correlation period as corresponding with overlapping sensor fields of view for the first electronic device and the second electronic device (505). The first electronic device can then determine relative position and orientation for the first electronic device and the second electronic device based on time, speed, and position data gathered for moving objects in the overlapping sensor fields of view (507). This determination can be performed by determining a transformation of the speed and position data for the object as detected by the second electronic device to match the speed and position data for the object as detected by the first electronic device. This transformation indicates the relative position and orientation of the first and second devices.

If the time, speed, and position data for the detected objects does not correlate (NO, 504), the first electronic device can determine if the sensor data from the first electronic device and the second electronic device indicates time shifted observations with correlated motion vectors (506). Time shifted observations would indicate that the same object may have been detected, though not at the same time, as the object moves across the separate fields of view of the electronic devices. If the data does not indicate time shifted observations (NO, 506), then the first electronic device and the second electronic device can each continue gathering sensor observations (508). Over time, it may be possible to determine relative positions based on commonly observed objects. If, after a period of time, the first electronic device cannot determine a position relative to any other detected electronic devices, the first electronic device can determine that it may be located a significant distance from any other sensor equipped devices.

If the first electronic device determines that the sensor data indicates time shifted observations with correlated motion vectors (YES, 506), the first electronic device can create a motion model for the objects (510). The first electronic device can then determine relative positions of the first electronic device and the second electronic device based on the motion model (512). The motion model can enable the prediction of a past and future position for an object detected in sensor data gathered by the first electronic device to model the movement of the object for the period before and after the object is within the field of view of the sensor of the first electronic device. The motion model can also enable the prediction of a past and future position for an object detected in sensor data gathered by the second electronic device to model the movement of the object for the period before and after the object is within the field of view of the sensors of the second electronic device. When the prediction for an object based on sensor data gathered by the first electronic device correlates with the sensor data observed by the second electronic device, the speed of the object and the time to move between sensor fields of view can be used to predict, at the least, a distance between the first electronic device and the second electronic device. Based on the degree of correlation, a difference in orientation between the devices (or the fields of view of the devices) can also be determined.

Figure 6:
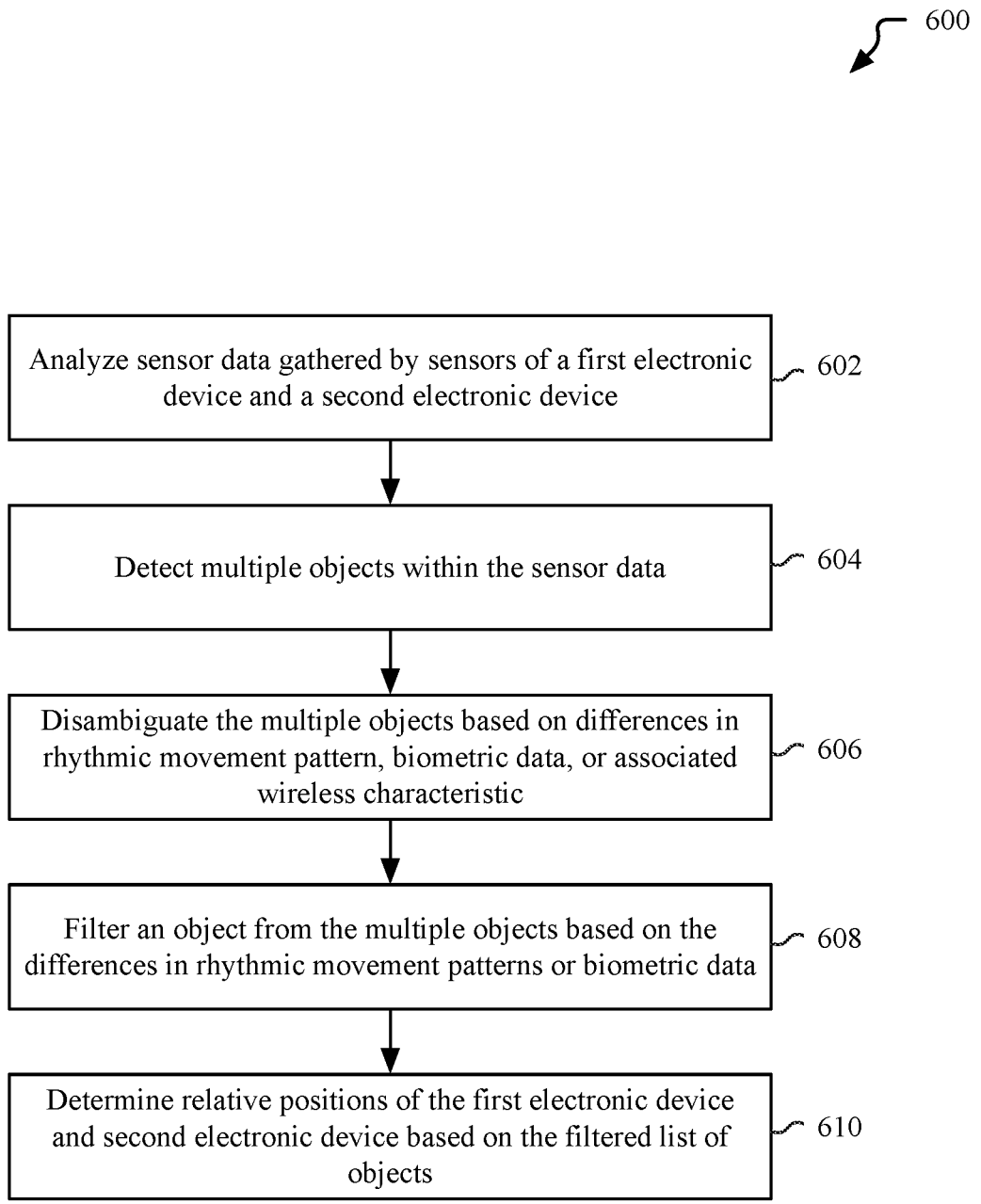
FIG. 6 illustrates a method for a sensor equipped electronic device to differentiate between multiple objects within sensor data.

FIG. 6 illustrates a method 600 for a sensor equipped electronic device to differentiate between multiple objects within sensor data. The differentiation includes differentiation between two concurrently detected objects, as well as determining that separate observations correspond to the same object.

The method 600 includes for an electronic device (e.g., the first or second electronic device) to analyze sensor data gathered by sensors of the first electronic device and the second electronic device (602). The electronic device can detect multiple objects within the sensor data (604) and disambiguate the multiple objects based on differences in rhythmic movement pattern, biometric data, or wireless signals that are detected concurrently with the multiple objects (606). The multiple objects may be multiple objects detected in a single scene by one or more of the electronic devices. The multiple objects may also be multiple objects that are separately detected by both of the electronic devices. When multiple objects are detected in a single scene, the objects may be differentiated based on a rhythmic movement pattern (e.g., stride, gait) associated with walking individuals. Where the data includes separately detected objects, the disambiguation logic can confirm that the movement patterns and/or biometrics of the separately detected objects correlate, such that the objects likely correspond to observation of the same individual. If an object is consistently detected currently with a specific wireless radio signal or data characteristic (e.g., wireless radio advertisement address, device identifier, etc.), that is distinct from those detected concurrently with other observations, then that characteristic may be informative as to the individual associated with the object detected within the sensor data.

The method 600 includes for an electronic device to filter an object from the multiple objects based on the differences in rhythmic movement patterns or biometric data (608). To filter an object can include to remove data associated with the object to create filtered sensor data. Alternatively, to filer an object can include to focus exclusively on data having the rhythmic movement patterns or biometric data detected for that object. Relative positions of the first electronic device and the second electronic device can then be determined based on the filtered list of objects (610).

Figure 7A:
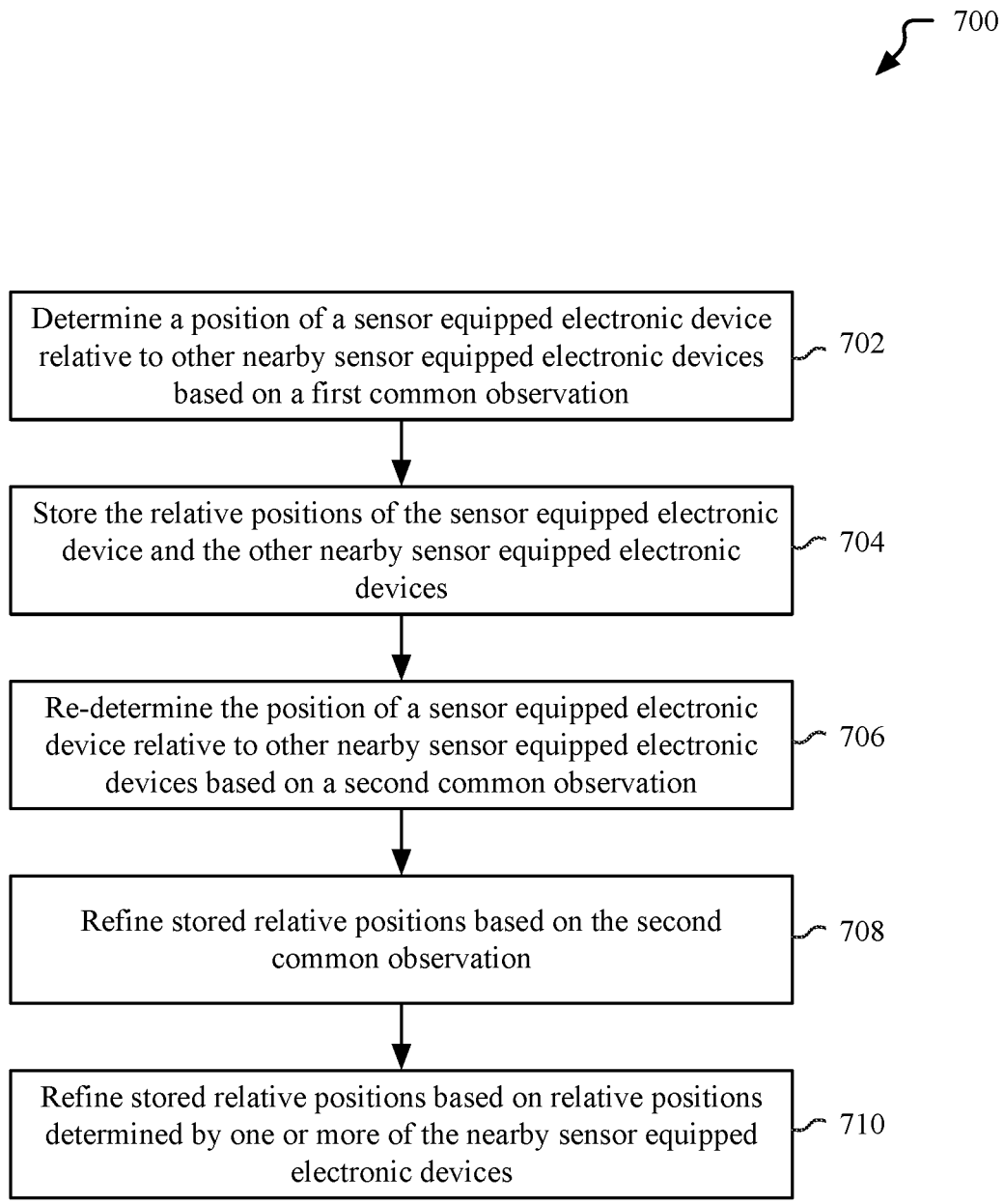
FIG. 7A-7B illustrate methods to refine determined relative positions over a period of time.
Figure 7B:
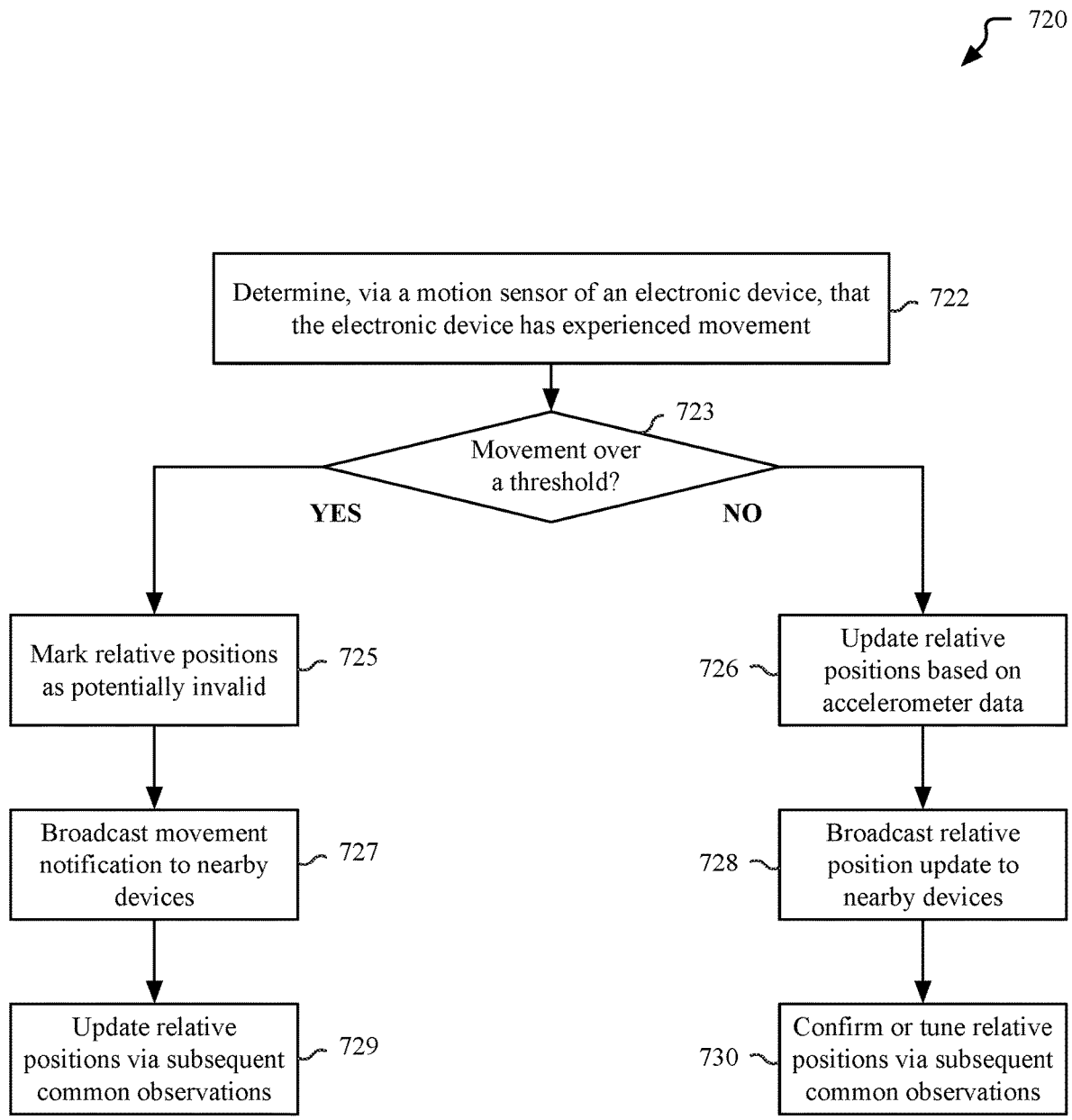

FIG. 7A-7B illustrate methods 700, 720 to refine determined relative positions over a period of time. FIG. 7A illustrates a method 700 of refining stored relative positions based on subsequent updates. FIG. 7B illustrates a method 720 updating relative positions in response to detecting movement at an electronic device. The methods 700, 720 can be performed by one or more of the electronic devices in a mesh of multiple electronic devices equipped with electromagnetic spatial sensors.

As shown in FIG. 7A, method 700 includes operations to enable a sensor equipped electronic device to determine a position of the device relative to other nearby sensor equipped electronic devices based on a first common observation (702). The sensor electronic device can then store the relative positions of the device and the other nearby sensor equipped electronic devices (704). The sensor equipped electronic device can then re-determine the position of a sensor equipped electronic device relative to other nearby sensor equipped electronic devices based on a second common observation (706).

The device can then refine the stored relative positions based on the second common observation (708). This refinement can be performed, in one embodiment, by performing an average operation or a weighted average operation of multiple determinations. Where a weighted average is performed, the weight for a position determination can be based on the confidence of the accuracy of the position determination. The accuracy determination can be based on the quality of the observation that is used to determine the relative position. The accuracy determination can then be based on the number of position data points that are present within the sensor data. One or more sensor-based metrics or parameters can also be used to determine an accuracy metric. For example, some sensors (e.g., radar) may have reduced angular resolution at longer range. Accordingly, longer range observations can be assigned a lower accuracy value.

The electronic device can additionally refine stored relative positions based on relative positions determined by one or more of the nearby sensor equipped electronic devices (710). As each sensor equipped electronic device will independently perform relative position calculations based on commonly observed objects, position determinations performed by the various devices can be refined at each device based on the collective set of measurements.

As shown in FIG. 7B, 720 includes operations to enable a sensor equipped electronic device to determine, via a motion a sensor of an electronic device, that the electronic device has experienced movement (722). In one embodiment, this determination is performed at least in part by a sensor processor on the electronic device, which can signal software logic executed by an application processor that movement has been detected. The electronic device can then determine, based on motion sensor data captured by the motion sensor, whether the amount of movement is over a threshold (723). Motion under the threshold may indicate that the device has been bumped or slightly repositioned, but has not experienced significant movement. Motion over the threshold may indicate that the device was significantly repositioned.

In one embodiment, when movement is not over the threshold (NO, 723), the electronic device may be able to update the relative position determination based on accelerometer data. In the event that the electronic device is able to accurately determine the amount and direction of movement based on detected acceleration and deceleration, the electronic device will update the stored set of relative positions to other sensor equipped electronic devices based on accelerometer data (726). The electronic device can then broadcast a relative position update to nearby devices (728). The relative position update may indicate that the update has occurred due to detected device movement. The electronic device can then confirm or tune the relative positions via subsequent data on objects that are commonly observed by multiple sensor equipped electronic devices (730).

In one embodiment, when movement is over the threshold (YES, 723), the electronic device can mark stored relative positions as potentially invalid (725) and broadcast a movement notification to nearby sensor equipped electronic devices (727). The movement notification indicates to the nearby sensor equipped electronic devices that the relative position of the broadcasting device has changed. The electronic device, and the nearby devices, can then update their relative positions via subsequent common observations (729).

It will be understood that some specific details described herein may vary based on the type of spatial sensor used to detect objects around the sensor equipped electronic device, with different types of sensors having different performance characteristics. For example, where a radar sensor is used, objects may be detected as a point cloud of detected radar reflections that are centered on the detected object. Sensor processing logic can then be used to filter out artifacts an anomalies in the returned signal. The radar sensor may operate using a polar coordinate system. Determination of positions relative to other radar equipped electronic devices can enable transformation from the polar coordinates associated with a first device to the polar coordinates with a second device. When a radar sensor is in use, raw radar data may be streamed between connected devices. Point clouds within the data can be used to resolve detected objects. For a radar sensor, the position element for an object is an easier transform relative to velocity, which is a radial vector to the system. Enabling transforms between sensors of multiple devices provide the sensor system a greater number of points to represent each detected object. The greater number of points increases the likelihood of success for point cloud clustering algorithms that are used to resolve details of a detected object. Initially, devices are not aware of the transform. Observing the motion of commonly detected objects is used to determine the transform that is used to fuse the sensor data.

Figure 8:
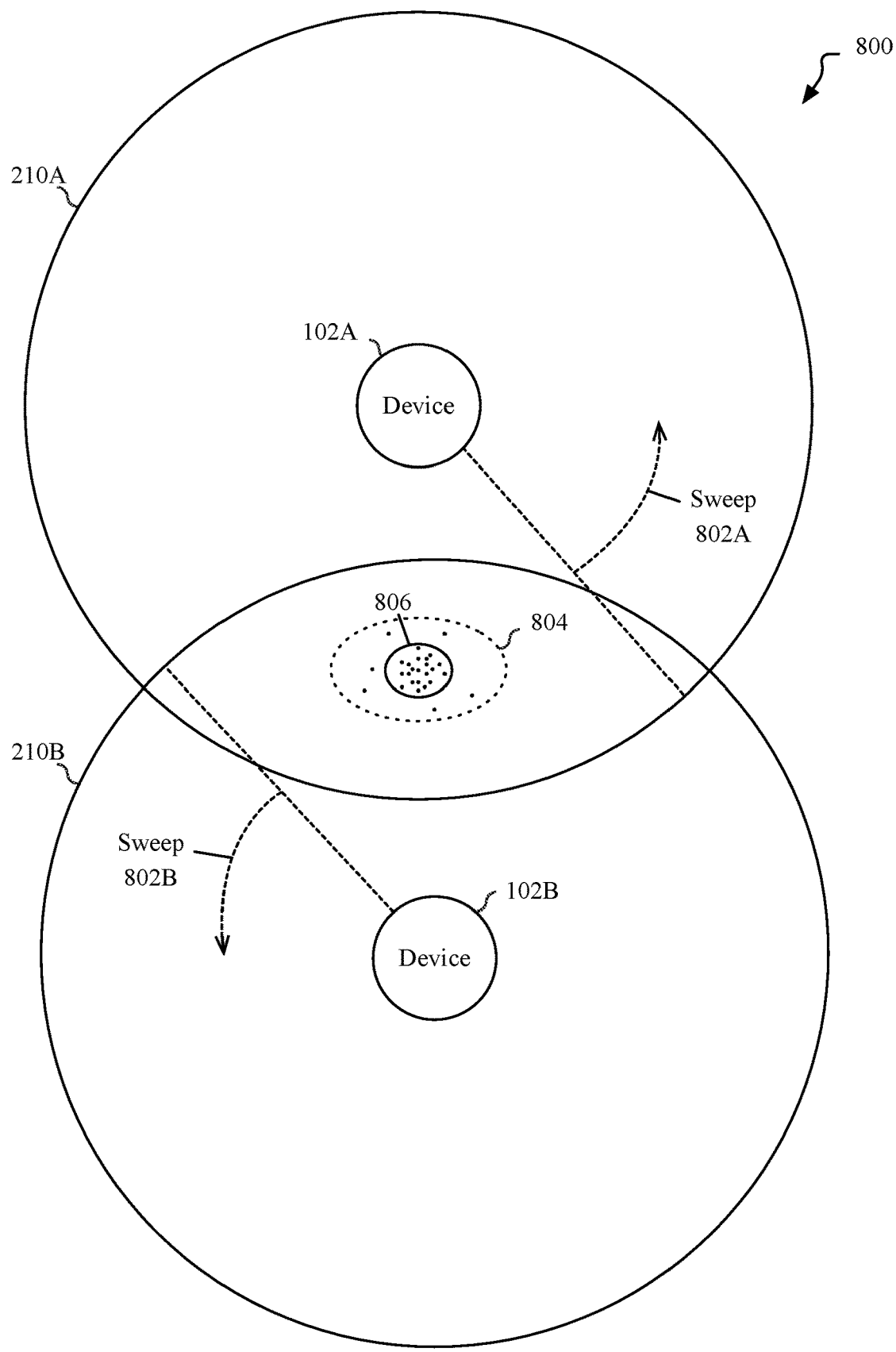
FIG. 8 illustrates a sensor system that includes multiple devices having fused radar sensors.

FIG. 8 illustrates a sensor system 800 that includes multiple devices having fused radar sensors. The sensor system 800 includes instances of electronic devices 102A-102B described herein, where the spatial sensors are radar sensors. The radar sensors of the electronic devices 102A-102B have respective sweep directions 802A-802B, such that a radar beam sweeps a 360 degree Field of view centered at each electronic devices 102A-102B. Alternatively, the radar sensors of the electronic devices 102A-102B may be MIMO radars with multiple antennas and capable of sensing the fields of view 210A-210B without scanning or sweeping. In either scenario, the angular resolution of the radar sensor may decrease with range. Thus, radar fields of view 210A-210B have a radius based on the effective range of the radar sensor. The effective range of the radar sensor is defined by the maximum range at which useful data may be resolved based on beam reflections. Once relative positions for the electronic devices 102A-102B are determined and a transform is computed to enable sensor data to be transformed between the electronic devices 102A-102B. While an individual sensor on an individual device may be able to detect a point cloud 804 for an object, a tighter cluster 806 of points can be resolved from fused sensor data from both of the electronic devices 102A-102B. The fused sensor data enables a higher combined resolution than possible with each individual device.

Once sensor equipped devices within an area have been able to synchronize their relative locations and establish a sensor network that expands the sensor capabilities of each device, further functionality can be enabled. For example, a collection of sensor equipped devices may collaborate to build a picture of a floor plan of the structure in which the devices are positioned. By identifying and tracking individuals as they move from one scene to another, the adjacency of rooms may be inferred, as well as the relative orientation of those rooms.

Figure 9:
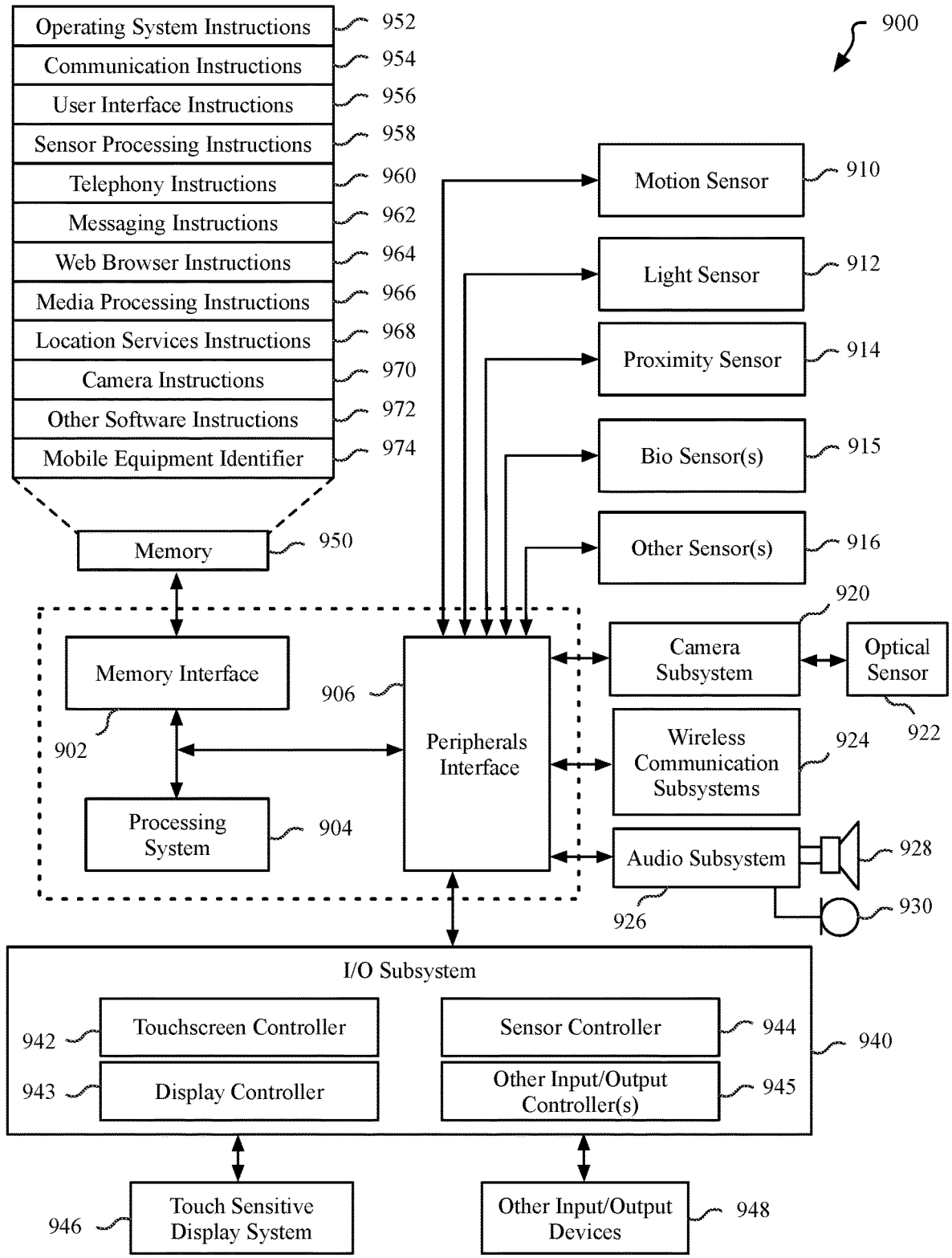
FIG. 9 is a block diagram of a device architecture for a mobile or embedded device, according to an embodiment.

FIG. 9 is a block diagram of a device architecture 900 for a mobile or embedded device, according to an embodiment. The device architecture 900 includes a memory interface 902, a processing system 904 including one or more data processors, image processors and/or graphics processing units, and a peripherals interface 906. The various components can be coupled by one or more communication buses or signal lines. The various components can be separate logical components or devices or can be integrated in one or more integrated circuits, such as in a system on a chip integrated circuit.

The memory interface 902 can be coupled to memory 950, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate the mobile device functionality. One or more biometric sensor(s) 915 may also be present, such as a fingerprint scanner for fingerprint recognition or an image sensor for facial recognition. Other sensors 916 can also be connected to the peripherals interface 906, such as a positioning system (e.g., GPS receiver), a temperature sensor, or other sensing device, to facilitate related functionalities. A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the wireless communication subsystems 924 can depend on the communication network(s) over which a mobile device is intended to operate. For example, a mobile device including the illustrated device architecture 900 can include wireless communication subsystems 924 designed to operate over a GSM network, a CDMA network, an LTE network, a Wi-Fi network, a Bluetooth network, or any other wireless network. In particular, the wireless communication subsystems 924 can provide a communications mechanism over which a media playback application can retrieve resources from a remote media server or scheduled events from a remote calendar or event server.

An audio subsystem 926 can be coupled to a speaker 928 and a microphone 930 to facilitate voice-enabled functions, such as voice recognition, voice replication, digital recording, and telephony functions. In smart media devices described herein, the audio subsystem 926 can be a high-quality audio system including support for virtual surround sound.

The I/O subsystem 940 can include a touch screen controller 942 and/or other input controller(s) 945. For computing devices including a display device, the touch screen controller 942 can be coupled to a touch sensitive display system 946 (e.g., touch-screen). The touch sensitive display system 946 and touch screen controller 942 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 946. Display output for the touch sensitive display system 946 can be generated by a display controller 943. In one embodiment, the display controller 943 can provide frame data to the touch sensitive display system 946 at a variable frame rate.

In one embodiment, a sensor controller 944 is included to monitor, control, and/or processes data received from one or more of the motion sensor 910, light sensor 912, proximity sensor 914, or other sensors 916. The sensor controller 944 can include logic to interpret sensor data to determine the occurrence of one of more motion events or activities by analysis of the sensor data from the sensors.

In one embodiment, the I/O subsystem 940 includes other input controller(s) 945 that can be coupled to other input/control devices 948, such as one or more buttons, rocker switches, thumb-wheel, infrared port, USB port, and/or a pointer device such as a stylus, or control devices such as an up/down button for volume control of the speaker 928 and/or the microphone 930.

In one embodiment, the memory 950 coupled to the memory interface 902 can store instructions for an operating system 952, including portable operating system interface (POSIX) compliant and non-compliant operating system or an embedded operating system. The operating system 952 may include instructions for handling basic system services and for performing hardware dependent tasks. In some implementations, the operating system 952 can be a kernel.

The memory 950 can also store communication instructions 954 to facilitate communicating with one or more additional devices, one or more computers and/or one or more servers, for example, to retrieve web resources from remote web servers. The memory 950 can also include user interface instructions 956, including graphical user interface instructions to facilitate graphic user interface processing.

Additionally, the memory 950 can store sensor processing instructions 958 to facilitate sensor-related processing and functions; telephony instructions 960 to facilitate telephone-related processes and functions; messaging instructions 962 to facilitate electronic-messaging related processes and functions; web browser instructions 964 to facilitate web browsing-related processes and functions; media processing instructions 966 to facilitate media processing-related processes and functions; location services instructions including GPS and/or navigation instructions 968 and Wi-Fi based location instructions to facilitate location based functionality; camera instructions 970 to facilitate camera-related processes and functions; and/or other software instructions 972 to facilitate other processes and functions, e.g., security processes and functions, and processes and functions related to the systems. The memory 950 may also store other software instructions such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. A mobile equipment identifier, such as an International Mobile Equipment Identity (IMEI) 974 or a similar hardware identifier can also be stored in memory 950.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions may be implemented in hardware and/or in software, including in one or more signal processing and/or application specific integrated circuits.

Figure 10:
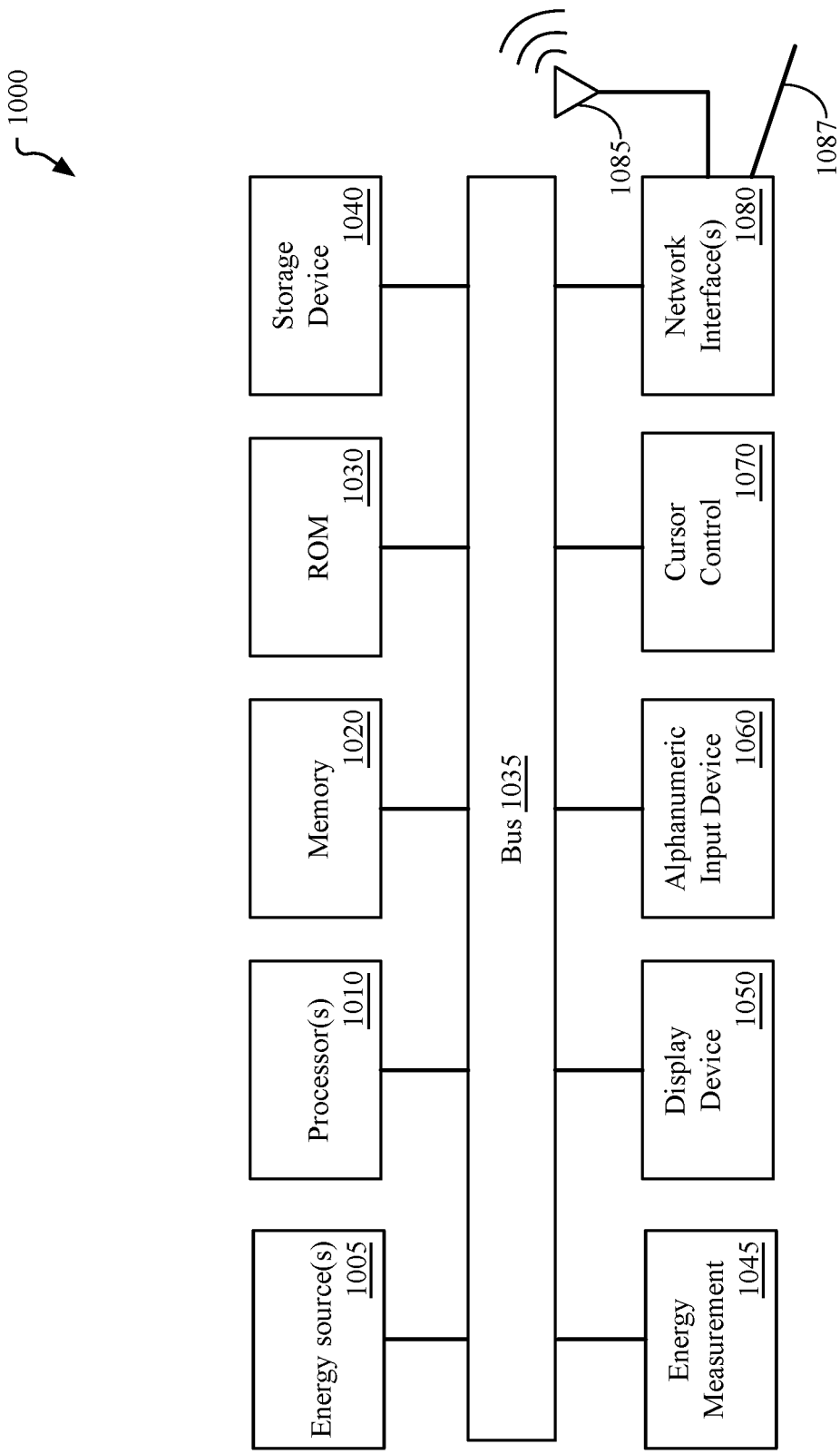
FIG. 10 is a block diagram of a computing system, according to an embodiment.

FIG. 10 is a block diagram of a computing system 1000, according to an embodiment. The illustrated computing system 1000 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1000 can be used to provide the computing device and/or a server device to which the computing device may connect.

The computing system 1000 includes bus 1035 or other communication device to communicate information, and processor(s) 1010 coupled to bus 1035 that may process information. While the computing system 1000 is illustrated with a single processor, the computing system 1000 may include multiple processors and/or co-processors. The computing system 1000 further may include random access memory 1020 (RAM) or other dynamic storage device coupled to the bus 1035. The memory 1020 may store information and instructions that may be executed by processor(s) 1010. Main memory 1020 may also be used to store temporary variables or other intermediate information during execution of instructions by the processor(s) 1010.

The computing system 1000 may also include read only memory (ROM) 1030 and/or another data storage device 1040 coupled to the bus 1035 that may store information and instructions for the processor(s) 1010. The data storage device 1040 can be or include a variety of storage devices, such as a flash memory device, a magnetic disk, or an optical disc and may be coupled to computing system 1000 via the bus 1035 or via a remote peripheral interface.

The computing system 1000 may also be coupled, via the bus 1035, to a display device 1050 to display information to a user. The computing system 1000 can also include an alphanumeric input device 1060, including alphanumeric and other keys, which may be coupled to bus 1035 to communicate information and command selections to processor(s) 1010. Another type of user input device includes a cursor control 1070 device, such as a touchpad, a mouse, a trackball, or cursor direction keys to communicate direction information and command selections to processor(s) 1010 and to control cursor movement on the display device 1050. The computing system 1000 may also receive user input from a remote device that is communicatively coupled via one or more network interface(s) 1080.

The computing system 1000 further may include one or more network interface(s) 1080 to provide access to a network, such as a local area network. The network interface(s) 1080 may include, for example, a wireless network interface having antenna 1085, which may represent one or more antenna(e). The computing system 1000 can include multiple wireless network interfaces such as a combination of Wi-Fi, Bluetooth®, near field communication (NFC), and/or cellular telephony interfaces. The network interface(s) 1080 may also include, for example, a wired network interface to communicate with remote devices via network cable 1087, which may be, for example, an Ethernet cable, a coaxial cable, a fiber optic cable, a serial cable, or a parallel cable.

In one embodiment, the network interface(s) 1080 may provide access to a local area network, for example, by conforming to IEEE 802.10 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1080 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1000 can further include one or more energy sources 1005 and one or more energy measurement systems 1045. Energy sources 1005 can include an AC/DC adapter coupled to an external power source, one or more batteries, one or more charge storage devices, a USB charger, or other energy source. Energy measurement systems include at least one voltage or amperage measuring device that can measure energy consumed by the computing system 1000 during a predetermined period of time. Additionally, one or more energy measurement systems can be included that measure, e.g., energy consumed by a display device, cooling subsystem, Wi-Fi subsystem, or other frequently used or high-energy consumption subsystem.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A method comprising:
    tracking an object via a first electromagnetic spatial sensor on a first electronic device, wherein tracking the object includes gathering a first set of sensor measurements of the object for a first period of time via a first sensor transceiver and determining a first set of direction and range measurements to the object via the first set of sensor measurements;
    receiving a second set of direction and range measurements to the object from a second electronic device, the second set of direction and range measurements determined using a second set of sensor measurements gathered via a second sensor transceiver on the second electronic device for the first period of time;
    determining whether the first electromagnetic spatial sensor has an overlapping field of view with the second electromagnetic spatial sensor or a non-overlapping field of view with the second electromagnetic spatial sensor;
    estimating, by the first electronic device based on a comparison of the first set of direction and range measurements with the second set of direction and range measurements, a position for the object relative to the second electronic device;
    calculating, by the first electronic device based on the position of the object relative to the second electronic device and the determining of whether the first electromagnetic spatial sensor has the overlapping view or the non-overlapping view, a position of the second electronic device relative to the first electronic device; and
    storing a position of the first electronic device relative to the second electronic device.

2. The method as in claim 1, additionally comprising:
    updating the position of the first electronic device based on a comparison of a third set of direction and range measurements with a fourth set of direction and range measurements, the fourth set of direction and range measurements received from the second electronic device.

3. The method as in claim 2, additionally comprising:
    updating the position of the first electronic device based on an indication from an accelerometer of the first electronic device that the first electronic device has moved.

4. The method as in claim 1, wherein estimating the position of the object relative to the second electronic device includes:
    determining that the first electromagnetic spatial sensor has the overlapping field of view with the second electromagnetic spatial sensor;
    comparing sensor data for the object from the first electromagnetic spatial sensor with sensor data for the object from the second electromagnetic spatial sensor when the object is in the overlapping field of view; and
    estimating, by the first electronic device, based on the comparison of the sensor data for the object in the overlapping field of view, the position of the second electronic device relative to the first electronic device.

5. The method as in claim 1, wherein estimating the position of the object relative to the second electronic device includes:
    determining that the first electromagnetic spatial sensor has the non-overlapping field of view with the second electromagnetic spatial sensor;
    calculating a motion vector of the object based on sensor data captured for the object by the first electromagnetic spatial sensor;

determining a delay between the object leaving the field of view of the first electromagnetic spatial sensor and the object entering the field of view of the second electromagnetic spatial sensor; and estimating, by the first electronic device, the position for the second electronic device based on the motion vector of the object and the delay.

6. The method as in claim 1, additionally comprising:

determining, by the first electronic device, motion parameters of the object based on data from the first electromagnetic spatial sensor and the second electromagnetic spatial sensor; and translating, by the first electronic device, a position of the object in a coordinate space of the second electronic device to the coordinate space of the first electronic device based on the position of the second electronic device relative to the first electronic device.

7. The method as in claim 1, wherein estimating, by the first electronic device based on the comparison of the first set of direction and range measurements with the second set of direction and range measurements, the position for the object relative to the second electronic device, includes:

determining that the object tracked via the first electromagnetic spatial sensor is a first object, the first object having first motion characteristics;

detecting motion data for multiple objects via the first electromagnetic spatial sensor and within data captured by the second electromagnetic spatial sensor, wherein the motion of the multiple objects indicate presence of the first object and presence of a second object having second motion characteristics; and filtering the motion of the second object from the motion of the multiple objects based on the second motion characteristics.

8. The method as in claim 7, wherein the first motion characteristics and the second motion characteristics are determined based on periodic patterns within the motion data for the multiple devices.

9. The method of claim 1, wherein the first electromagnetic spatial sensor and the second electromagnetic spatial sensor are radar sensors.

10. The method as in claim 9, further comprising adjusting a radar transmit power of the first electromagnetic spatial sensor based on the position of the second electronic device relative to the first electronic device.

11. The method as in claim 10, further comprising calculating a coordinate space transformation to transform radar sensor data determined by the second electronic device into a coordinate space of the first electronic device, the coordinate space transformation calculated based at least in part based on the position of the second electronic device relative to the first electronic device.

12. The method as in claim 11, further comprising:

receiving radar sensor data from the second electronic device;

transforming the radar sensor data based on the coordinate space transformation into transformed radar sensor data;

fusing the transformed radar sensor data with radar sensor data gathered by the first electronic device into fused radar sensor data; and performing object detection based on the fused radar sensor data.

13. The method as in claim 12, wherein one or more of the first electronic device and the second electronic device is a smart home appliance device.

14. A non-transitory machine-readable medium storing instructions which, when executed by one or more processors, cause the one or more processors to perform operations comprising:

tracking an object via a first electromagnetic spatial sensor on a first electronic device, wherein tracking the object includes gathering a first set of sensor measurements of the object for a first period of time via a first sensor transceiver and determining a first set of direction and range measurements to the object via the first set of sensor measurements;

receiving a second set of direction and range measurements to the object from a second electronic device, the second set of direction and range measurements determined using a second set of sensor measurements gathered via a second sensor transceiver on the second electronic device for the first period of time;

determining whether the first electromagnetic spatial sensor has an overlapping field of view with the second electromagnetic spatial sensor or a non-overlapping field of view with the second electromagnetic spatial sensor;

estimating, by the first electronic device based on a comparison of the first set of direction and range measurements with the second set of direction and range measurements, a position for the object relative to the second electronic device;

calculating, by the first electronic device based on the position of the object relative to the second electronic device and the determining of whether the first electromagnetic spatial sensor has the overlapping view or the non-overlapping view, a position of the second electronic device relative to the first electronic device; and storing a position of the first electronic device relative to the second electronic device.

15. The non-transitory machine-readable medium of claim 14, the operations further comprising:

updating the position of the first electronic device based on a comparison of a third set of direction and range measurements with a fourth set of direction and range measurements, the fourth set of direction and range measurements received from the second electronic device.

16. The non-transitory machine-readable medium of claim 15, the operations further comprising:

updating the position of the first electronic device based on an indication from an accelerometer of the first electronic device that the first electronic device has moved.

17. The non-transitory machine-readable medium of claim 14, wherein estimating the position of the object relative to the second electronic device includes:

determining that the first electromagnetic spatial sensor has the overlapping field of view with the second electromagnetic spatial sensor;

comparing sensor data for the object from the first electromagnetic spatial sensor with sensor data for the object from the second electromagnetic spatial sensor when the object is in the overlapping field of view; and estimating, by the first electronic device, based on the comparison of the sensor data for the object in the overlapping field of view, the position of the second electronic device relative to the first electronic device.

18. The non-transitory machine-readable medium of claim 14, wherein estimating the position of the object relative to the second electronic device includes:

determining that the first electromagnetic spatial sensor has the non-overlapping field of view with the second electromagnetic spatial sensor;
calculating a motion vector of the object based on sensor data captured for the object by the first electromagnetic spatial sensor;
determining a delay between the object leaving the field of view of the first electromagnetic spatial sensor and the object entering the field of view of the second electromagnetic spatial sensor; and
estimating, by the first electronic device, the position for the second electronic device based on the motion vector of the object and the delay.

19. The non-transitory machine-readable medium of claim 14, the operations further comprising:
determining, by the first electronic device, motion parameters of the object based on data from the first electromagnetic spatial sensor and the second electromagnetic spatial sensor; and
translating, by the first electronic device, a position of the object in a coordinate space of the second electronic device to the coordinate space of the first electronic device based on the position of the second electronic device relative to the first electronic device.

20. The non-transitory machine-readable medium of claim 14, wherein estimating, by the first electronic device based on the comparison of the first set of direction and range measurements with the second set of direction and range measurements, the position for the object relative to the second electronic device, includes:
determining that the object tracked via the first electromagnetic spatial sensor is a first object, the first object having first motion characteristics;
detecting motion data for multiple objects via the first electromagnetic spatial sensor and within data captured by the second electromagnetic spatial sensor, wherein the motion of the multiple objects indicate presence of the first object and presence of a second object having second motion characteristics; and
filtering the motion of the second object from the motion of the multiple objects based on the second motion characteristics.

21. The non-transitory machine-readable medium of claim 20, wherein the first motion characteristics and the second motion characteristics are determined based on periodic patterns within the motion data for the multiple devices.

22. The non-transitory machine-readable medium of claim 14, wherein the first electromagnetic spatial sensor and the second electromagnetic spatial sensor are radar sensors.

23. The non-transitory machine-readable medium of claim 14, operations further comprising:
adjusting a radar transmit power of the first electromagnetic spatial sensor based on the position of the second electronic device relative to the first electronic device.

24. The non-transitory machine-readable medium of claim 23, operations further comprising:
calculating a coordinate space transformation to transform radar sensor data determined by the second electronic device into a coordinate space of the first electronic device, the coordinate space transformation calculated based at least in part based on the position of the second electronic device relative to the first electronic device.

25. The non-transitory machine-readable medium of claim 24, operations further comprising:
receiving radar sensor data from the second electronic device;
transforming the radar sensor data based on the coordinate space transformation into transformed radar sensor data;
fusing the transformed radar sensor data with radar sensor data gathered by the first electronic device into fused radar sensor data; and
performing object detection based on the fused radar sensor data.

26. The non-transitory machine-readable medium of claim 14, wherein one or more of the first electronic device and the second electronic device is a smart home appliance device.

* * * * *